US006546400B1

(12) United States Patent
Aberson

(10) Patent No.: US 6,546,400 B1
(45) Date of Patent: Apr. 8, 2003

(54) METHOD AND SYSTEM FOR CREATING TRADING CARDS

(76) Inventor: Nathan G. Aberson, 2099 Ellwyn Dr., Atlanta, GA (US) 30341

(*) Notice: Subject to any disclaimer, the term of this patent is extended or adjusted under 35 U.S.C. 154(b) by 0 days.

(21) Appl. No.: 09/394,155

(22) Filed: Sep. 13, 1999

Related U.S. Application Data

(60) Provisional application No. 60/126,183, filed on Mar. 25, 1999, and provisional application No. 60/119,113, filed on Feb. 8, 1999.

(51) Int. Cl.[7] ............................................. G06F 17/30
(52) U.S. Cl. ................... 707/104.1; 707/9; 707/103 R; 707/517; 707/530
(58) Field of Search ........................... 707/9, 100, 200, 707/517, 530, 104.1; 705/26, 77; 463/1, 44; 709/217, 219, 227; 273/293; 358/296

(56) References Cited

U.S. PATENT DOCUMENTS

| | | | | |
|---|---|---|---|---|
| 3,868,283 A | | 2/1975 | Scheyer ........................ 156/58 |
| 5,063,698 A | * | 11/1991 | Johnson et al. ................ 379/75 |
| 5,215,792 A | * | 6/1993 | Miller ........................... 428/14 |
| 5,417,431 A | | 5/1995 | Gluck .......................... 273/293 |
| 5,433,035 A | * | 7/1995 | Bauer ....................... 40/124.03 |
| 5,480,156 A | * | 1/1996 | Doederlein et al. .......... 704/270 |
| 5,533,124 A | * | 7/1996 | Smith et al. .................... 705/57 |
| 5,579,117 A | | 11/1996 | Arsenault et al. ............. 358/296 |
| 5,588,678 A | | 12/1996 | Young .......................... 704/272 |
| 5,640,565 A | * | 6/1997 | Dickinson ................ 707/103 R |
| 5,687,087 A | | 11/1997 | Taggart ........................ 700/233 |
| 5,695,346 A | | 12/1997 | Sekiguchi ..................... 434/365 |
| 5,732,229 A | * | 3/1998 | Dickinson ..................... 345/764 |
| 5,748,731 A | | 5/1998 | Shepherd ........................ 705/57 |
| 5,803,501 A | | 9/1998 | Gluck ........................... 283/75 |
| 5,938,199 A | * | 8/1999 | Doederlein et al. .......... 273/237 |
| 5,995,105 A | * | 11/1999 | Reber et al. .................. 345/835 |
| 6,200,216 B1 | * | 3/2001 | Peppel ............................ 463/1 |
| 6,247,011 B1 | * | 6/2001 | Jecha et al. .................. 707/100 |

* cited by examiner

*Primary Examiner*—Shahid Al Alam
(74) *Attorney, Agent, or Firm*—Sutherland Asbill & Brennan, LLP

(57) ABSTRACT

Statistical data relating to the performance of a person in an activity, such as a sporting activity, may be stored in a memory storage device. One or more digital images may also be stored in the memory storage device along with pre-defined trading card templates. A template comprises a pre-designed arrangement of statistical data fields and at least one image field. A trading card is created by importing selected statistical data into the statistical data fields of the template and importing a selected digital image into the image field of the template. Statistical data relating to a plurality of people may be stored in the memory storage device so that the statistics of one person may be compared to those of another person. A finalized trading card may be stored as a card file in the memory storage device. The user may print the card file to a local printer or may submit a request for a professionally printed version of the trading card. The card file may be transmitted to a professional printing service provider. The system and method may be practiced in a stand-alone computer environment or in a distributed network environment.

43 Claims, 12 Drawing Sheets

METHOD AND SYSTEM FOR CREATING TRADING CARDS

This Appln claims benefit of Prov. No. 60/126,183 filed Mar. 25, 1999 and claims benefit of Prov. No. 60/119,113 filed Feb. 8, 1999.

FIELD OF THE INVENTION

The present invention relates in general to trading cards. More particularly, the present invention relates to a computerized method and system for creating trading cards.

BACKGROUND OF THE INVENTION

Trading cards, such as professional sports trading cards, are a popular source of entertainment for children and adults alike. Oftentimes, people emulate the sports heroes that they see on television and hope to perform fantastic athletic feats just like their sports heroes. As part of this fantasy, people may desire to have a trading card featuring themselves in the performance of a sporting activity similar to that of their heroes. Thus, there is a need for a simple, cost-effective method and system for creating customized trading cards, such as by using a computer system.

Trading cards typically include various statistics relating to the featured person's performance of a sporting activity. Trading cards are typically created on a periodic basis so as to include up-to-date statistical data of the featured person. Some trading cards may further include comparative statistics based on other people participating in the same or similar sporting activity. Thus, there is a need for a method and system for creating sports cards that includes central repository for storing, and updating statistical data of one or more persons.

SUMMARY OF THE INVENTION

The present invention fulfills the needs in the art by providing a system and method for creating a customized trading card. Statistical data may be stored in a memory storage device, such as in a data file or in a statistics database. The statistical data may relate to the performance of a person in an activity, such as a sporting activity. One or more digital images may also be stored in the memory storage device.

A number of pre-defined trading card templates may also be stored in the memory storage device, such as in a template database or any other data file. A template comprises a pre-designed arrangement of statistical data fields and an image field. Front templates may be designed for the front of the trading card and back templates may be designed for the back of the trading card. A user may be provided with the option to select a front template and a back template. The trading card is created by importing the statistical data into the statistical data fields of the template and importing the digital image into the image field of the template.

Statistical data relating to a plurality of people may be stored in memory. As such, the statistics of one person may be compared to those of another person in order to determine an ordinal rank for the first person relating to the first statistic. The ordinal rank may also be imported into a selected one of the statistical data fields of the template.

The statistical data may relate to the performance of a person in a sporting activity and may comprises game/season statistics. For example, if the sporting activity is baseball, the game/season statistics may comprise trips to the plate and hits. The present invention may be configured to automatically calculate a cumulative statistic from the game/season statistics. In the baseball example, the cumulative statistic may be a batting average, a slugging percentage or an ERA. The cumulative statistic may also be imported into a selected one of the statistical data fields of the template.

In a distributed network environment, the present invention may comprise a central server for executing a trading card program module. A user device may interact with the central server via the distributed network, such as by way of a web-browser. At the central server, a statistics database or a data file may be maintained for storing statistical data received from the user device. An image file may also be received at the central server from the user device. In response to receiving statistical data and an image file from the user device, the central server may present a list of pre-defined templates to the user device. The pre-defined templates may be stored in a templates database or a data file at the central server.

In response to the list of pre-defined templates, the central server may receive a template selection command from the user device indicating a selected template from the list of pre-defined templates. The central server may then import the image file received from the user device into an image field of the selected template and import the statistical data into statistical data fields of the selected template so as to create the trading card. The trading card may then be presented to the user device.

The central server may also receive an edit command from the user device indicating that the trading card is to be edited. In response to the edit command, the central server may edit the trading card. The finalized trading card may then be stored as a card file in a memory, such as in a card database accessible by the central server. The user may print the card file to a local printer at the user device or may submit a request for a professionally printed version of the trading card to the central server. The central server may include or may be in communication with hardware and software components for generating the requested professionally printed cards. Alternately, the central server may transmit the card file to a professional printing service provider. The professional printing service provider may be an independent entity, or may be the same entity that controls or maintains the central server. The central server may receive an electronic payment authorization, such as a financial account number, from the user device for the professionally printed version of the trading cards. If appropriate, the central sever and the professional printing service provider may also perform settlement by way of electronic funds transfer.

BRIEF DESCRIPTION OF THE DRAWINGS

FIG. 3 is a screenshot demonstrating an illustrative form that allows a user to input game/season statistics for a selected player on a game-by-game basis according to an exemplary embodiment of the present invention.

FIG. 4 is a screenshot demonstrating an illustrative form that allows a user to enter game/season statistics on a game by game basis.

DETAILED DESCRIPTION OF THE INVENTION

Figure 1:
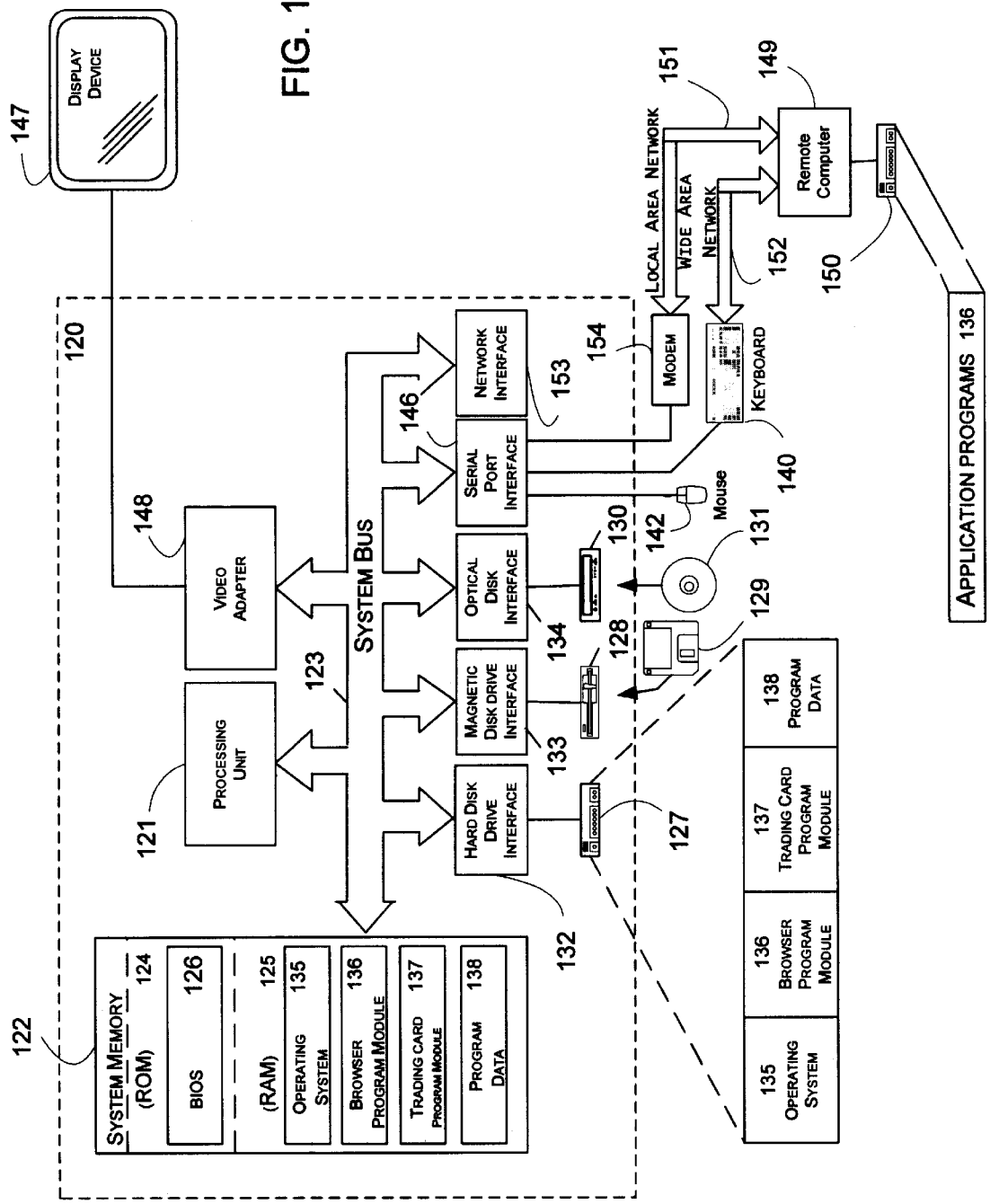
FIG. 1 is a block diagram of a computer system that provides an exemplary operating environment for an exemplary embodiment of the present invention.

Referring now to the drawings, in which like numerals represent like elements throughout the several figures, aspects of various embodiments of the present invention and exemplary operating environments therefor will be described.

FIG. 1 and the following discussion are intended to provide a brief, general description of a suitable computing environment in which an exemplary embodiment of the present invention may be implemented. The present invention may comprise a trading card program module 137 configured for execution by a computer system 120. While the invention will be described herein in the general context of a program module running in conjunction with a personal computer, those skilled in the art will recognize that the invention also may be implemented in combination with other program modules. Generally, program modules include routines, programs, components, data structures, etc. that perform particular tasks or implement particular abstract data types.

A conventional computer system 120 includes a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer 120, such as during start-up, is typically stored in ROM 124. The computer system 120 further includes a hard disk drive 127, a magnetic disk drive 128, e.g., to read from or write to a removable disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively.

The drives and their associated computer-readable media provide nonvolatile storage for the personal computer 120. A number of program modules may be stored in the drives and RAM 125 of a computer system 120, including an operating system 135, one or more application programs, such as a browser program module 136, the inventive trading card program module 137 and other program modules (not shown). Program data 138 and other types of data may also be stored in the drives and RAM 125 of the computer system 120. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A user may enter commands and information into the personal computer 120 through a keyboard 140 and pointing device, such as a mouse 142. Other input devices (not shown) may include a microphone, joystick, game pad, satellite dish, scanner, or the like. These and other input devices are often connected to the processing unit 121 through a serial port interface 146 that is coupled to the system bus 123, but may be connected by other interfaces, such as a game port or a universal serial bus (USB). A monitor 147 or other type of display device is also connected to the system bus 123 via an interface, such as a video adapter 148. In addition to the monitor, personal computers typically include other peripheral output devices (not shown), such as speakers or printers.

The personal computer 120 may operate in a networked environment using logical connections to one or more remote computers, such as a remote computer 149. The remote computer 149 may be a client, a server, a router, a peer device or other common network node, and typically includes many or all of the elements described relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, Intranets and the Internet.

When used in a LAN networking environment, the personal computer 120 may be connected to the LAN 151 through a network interface 153. When used in a WAN networking environment, the personal computer 120 typically includes a modem 154 or other means for establishing communications over the WAN 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Those skilled in the art will appreciate that various embodiments of the present invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

In one embodiment, the present invention is designed to allow a user to create a customized trading card. As is known in the art, a trading card typically includes biographical information, statistics, photographs and other graphical objects, and the like. Although a trading card may relate to any theme desired by the user, a preferred embodiment of the invention is described herein with reference to trading cards relating to sporting activities. Information included on sports trading cards may comprise statistics such as the age, height, weight, position, and hometown of the featured person, the year of a playing season, and a team name. Such information will be referred to herein as demographic statistics.

In addition, a sports trading card may include statistics of particular relevance to an individual sport. By way of example, a baseball trading card may include statistics relating to: hits, walks, singles, doubles, triples, home runs, number of trips to the plate, times hit by pitch, number of sacrifices, batting preference, throwing preference, runs scored, runs batted in, stolen bases, games played, games pitched, innings pitched, wins, losses, saves, strikeouts, earned runs allowed, walks allowed, hits allowed, complete games pitched, etc. Similarly, a basketball card may include statistics relating to: games played, shots taken, shots made, 3-point shots taken, 3-point shots made, free throws attempted, free throws made, total points scored, number of assists, number of steals, number of blocked shots, number of rebounds, number of offensive rebounds, number of double doubles, number of triple doubles, etc. Football cards may include statistics relating to: games played, rushing attempts, rushing yards, passing attempts, number of completions, passing yards, number of interceptions, number of tackles, number of sacks, touchdowns, field goals attempted, field goals made, number of extra points attempted, number of extra points made, total points scored, number of punts, punting yards, punts blocked, etc. As yet another example, hockey or soccer cards may include statistics relating to: games played, goals, assists, total points, shots on goal, goals allowed, etc. Such types of statistics of particular relevance to an individual sport will be referred to herein as game/season statistics.

The present invention may be configured to prompt the user for entry of statistical data, including but not limited to the demographic statistics and game/season statistics mentioned above. The present invention may allow the user to select a particular sport for the trading card from a pre-defined list of sports. Those skilled in the art will recognize that the above listed sporting activities are intended to be by way of example only. The present invention may be configured for the creation of trading cards relating to any other sporting activity, as well as any other theme desired by the user. In response to the user's selection of a sport, the user may be presented with pre-defined input fields designed to facilitate entry of statistical information of particular relevance to the selected sport. In a more specialized embodiment, the present invention may be designed for the creation of a trading card relating to only one particular sport, e.g. baseball.

In an exemplary embodiment, the present invention may comprise appropriate algorithms for calculating various cumulative statistics based on the game/season statistical data provided by the user. Again, cumulative statistics may be specific to individual sports. By way of example, for a baseball trading card, the present invention may be configured to calculate: batting average, earned run average, slugging percentage, on base percentage, batting average against, strikeouts per game, walks per game, etc. based on statistical data input by the user. Likewise, for a basketball trading card, the present invention may be configured to calculate: field goal percentage, 3-point field goal percentage, free throw percentage, points per game, assists per game, steals per game, blocked shots per game, rebounds per game, offensive rebounds per game, etc. Further, for a football trading card the present invention may include functionality for calculating: rushing yards per carry, rushing yards per game, passing yards per game, completion percentage, tackles per game, field goal percentage, extra point percentage, punting yards average, etc. For hockey or soccer trading cards, the present invention may include functionality for calculating: goals per game, assists per game, goals allowed per game, etc. Of course, the user may be provided with the option to accept the cumulative statistics calculated by the present invention or to input his/her own cumulative statistic values.

In another embodiment of the present invention, the user is able to input game/season statistics for multiple games and/or seasons. Thus, the invention may include algorithms for calculating career statistics based upon the statistical data input for a player for all of the seasons. Again, the user may be provided with the option to accept the career statistics calculated by the present invention or to input his/her own values for career statistics. The present invention may also include functionality for generating reports, such as spreadsheets or the like, in order to assist a user in keeping track of game/season statistics, career statistics, etc.

FIGS. 2–9 are exemplary screenshots that are indicative of the logical process and flow by which an embodiment of the present invention will handle the input of statistical data and the designing of customized trading cards. The exemplary screen shots represent forms that may be presented to the user for the entry of statistical data. Those skilled in the art will recognize that forms are but one way to facilitate entry of data into a computer system. Furthermore, the forms shown are by way of example only and are merely intended to demonstrate basic functionality. Forms or other input fields and graphical user interfaces utilized in a commercial embodiment of the present invention may be much more visually appealing and may incorporate any number of graphical, audio and/or video objects. It should be further noted that the exemplary forms of FIGS. 2–9 are tailored for use in creating a baseball or softball trading card, but the forms may be easily modified for use in creating trading cards for other sports or other themes.

In an exemplary embodiment, a main switchboard screen (not shown) may be implemented. A main switchboard screen may comprise an introductory or "home" screen through which the user may access various functions of the present invention. By way of example, from a main switchboard screen, the user may be provided with the option to enter statistical data into memory (e.g. in a statistics database or a data file), to access the statistical data of other users from memory for comparative purposes, or to select and configure a trading card template for the creation of a customized trading card. These and other functions may be presented as options to the user on a main switchboard screen.

Figure 2:
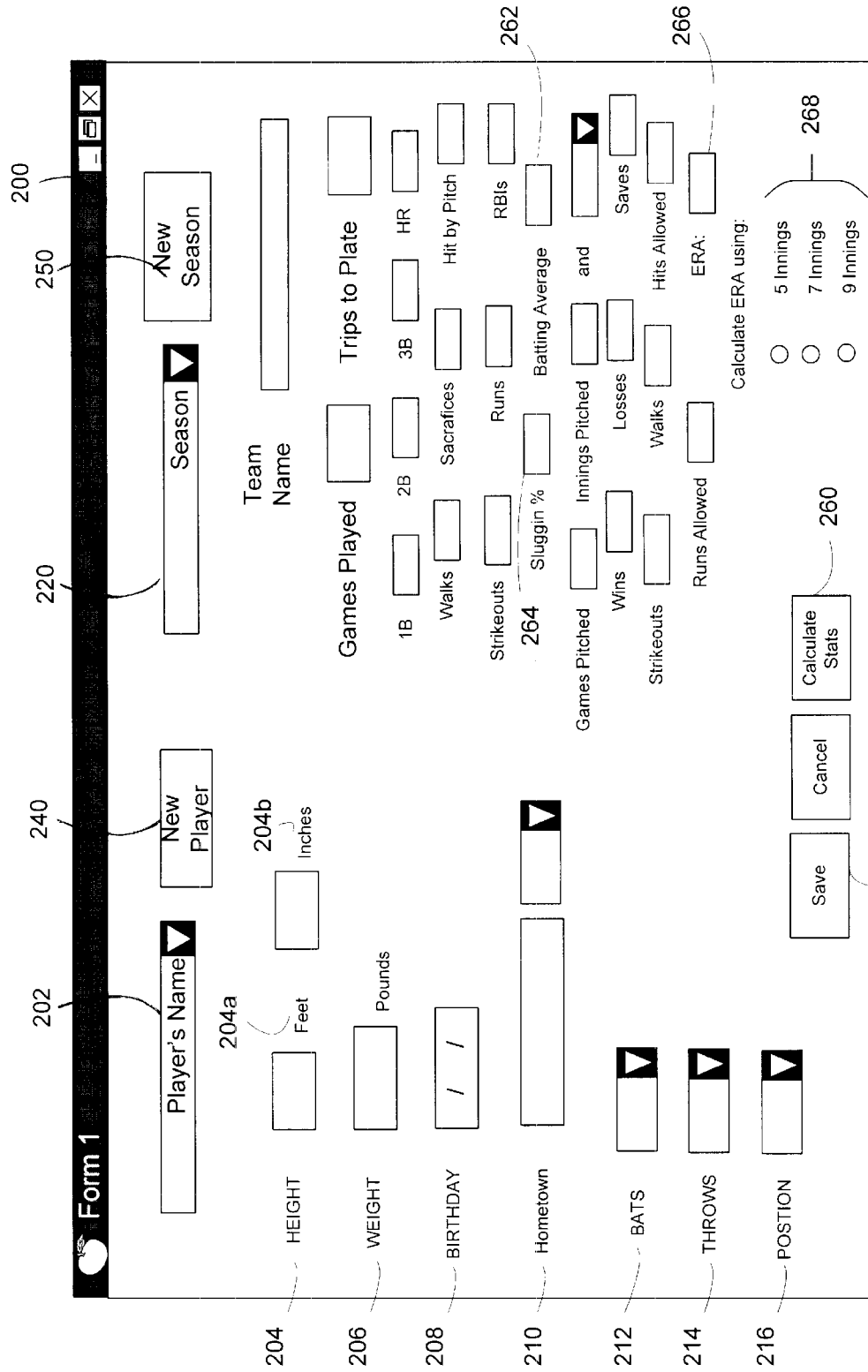
FIG. 2 is a screenshot demonstrating an illustrative form for inputting, editing and viewing demographic statistics and game/season statistics according to an exemplary embodiment of the present invention.

FIG. 2 is a screenshot demonstrating an illustrative form 200 for inputting, editing and viewing demographic statistics and game/season statistics. As shown, a "Player's Name" drop-down menu 202 may be a list of all players currently having records in a statistics database of the present invention. Upon selecting a player from the "Player's Name" drop-down menu 202, various fields may be filled in with statistical data stored in the statistics database in association with the selected player. For example, selection of an existing player may cause the following fields to be automatically filled in with the appropriate demographic statistics: the "HEIGHT" field 204 (comprising the "Feet" field 204a and the "Inches" field 204b), the "WEIGHT" field 206, the "BIRTHDAY" field 208, the "HOMETOWN" fields 210, the "BATS" field 212, the "THROWS" field 214, and the "POSITION" field 216.

When a player has stored in memory statistics corresponding to more than one season, a "Season" drop-down menu 220 may be provided to list all seasons currently stored in the database. When an existing season is selected, the statistics therefor may be automatically retrieved from memory and displayed in the appropriate fields. The "Season" drop-down menu 220 may include a "Career" option, the selection of which would cause the career statistics for the selected player to be displayed in the appropriate fields. Career statistics may have been entered into memory by the user, or may be calculated by the present invention by summing and/or averaging existing game/season statistics. Any statistical data retrieved from memory and automatically displayed in the form 200 may be edited by the user, who may select any one of the fields and modify the statistic displayed therein. Changes made to statistics may be saved automatically upon entry, or preferably upon activation of a "Save" button 230.

Statistical records for a new player may be created by activation of the "New Player" button 240. Upon activation of the "New Player" button 240, the "Player's Name" drop-down menu 202 may be converted to an input field for entry of the new player's name. The remaining fields on the form 200 may be left blank so that the user may input therein the statistics for the new player. In an alternate embodiment, activation of the "New Player" button 240 may trigger the presentation of a new screen (not shown) for entry of a new player's name and other demographic statistics. Similarly, upon activation of the "New Season" button 250, the "Season" drop-down menu 220 may be converted to an input field for input of a new season name or a new screen (not shown) may be presented for entry of the new season name, a new team name (if appropriate) and the player's game/season statistics.

Certain fields on the form 200 may be inactive while the user enters demographic statistics and game/season statistics. In other words, the user may not be permitted to enter data into certain fields, which may be reserved for cumulative statistics. As shown, the exemplary form 200 includes three darkened fields reserved for cumulative statistics: a "Batting Average" field 262, a "Slugging %" field 264 and an "ERA" field 266. An exemplary embodiment of the present invention may be configured to calculate and display cumulative statistics, based on certain game/season statistics, when the user activates the "Calculate Stats" button 260. The user may also be given the option to specify how certain calculations are made, such as by selection of one of the "Calculate ERA using:" radio buttons 266. After cumulative statistics are calculated and displayed, the fields may be activated so that the user may manually modify the cumulative statistics if he/she so desires.

Figure 3:
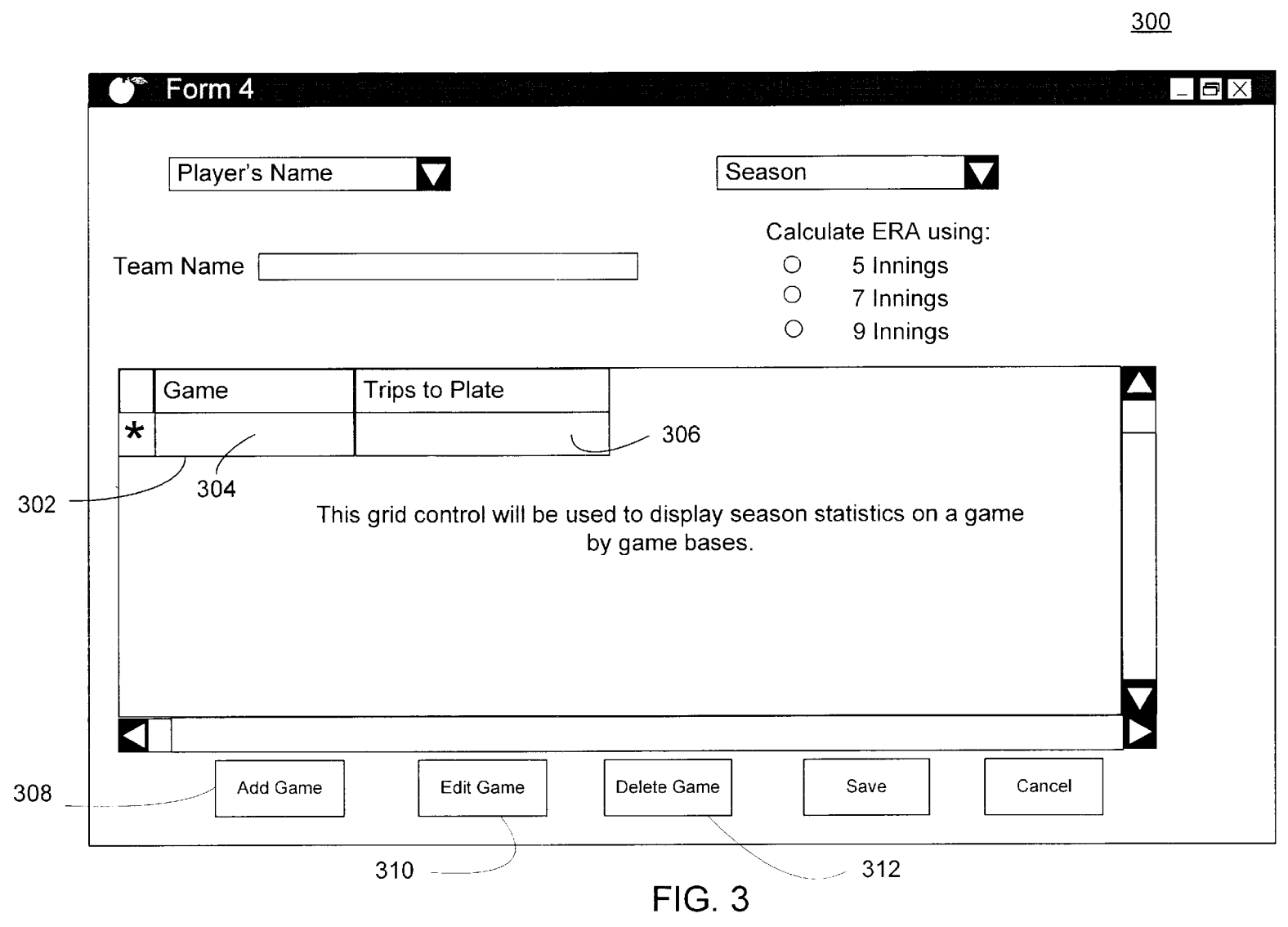
Figure 4:
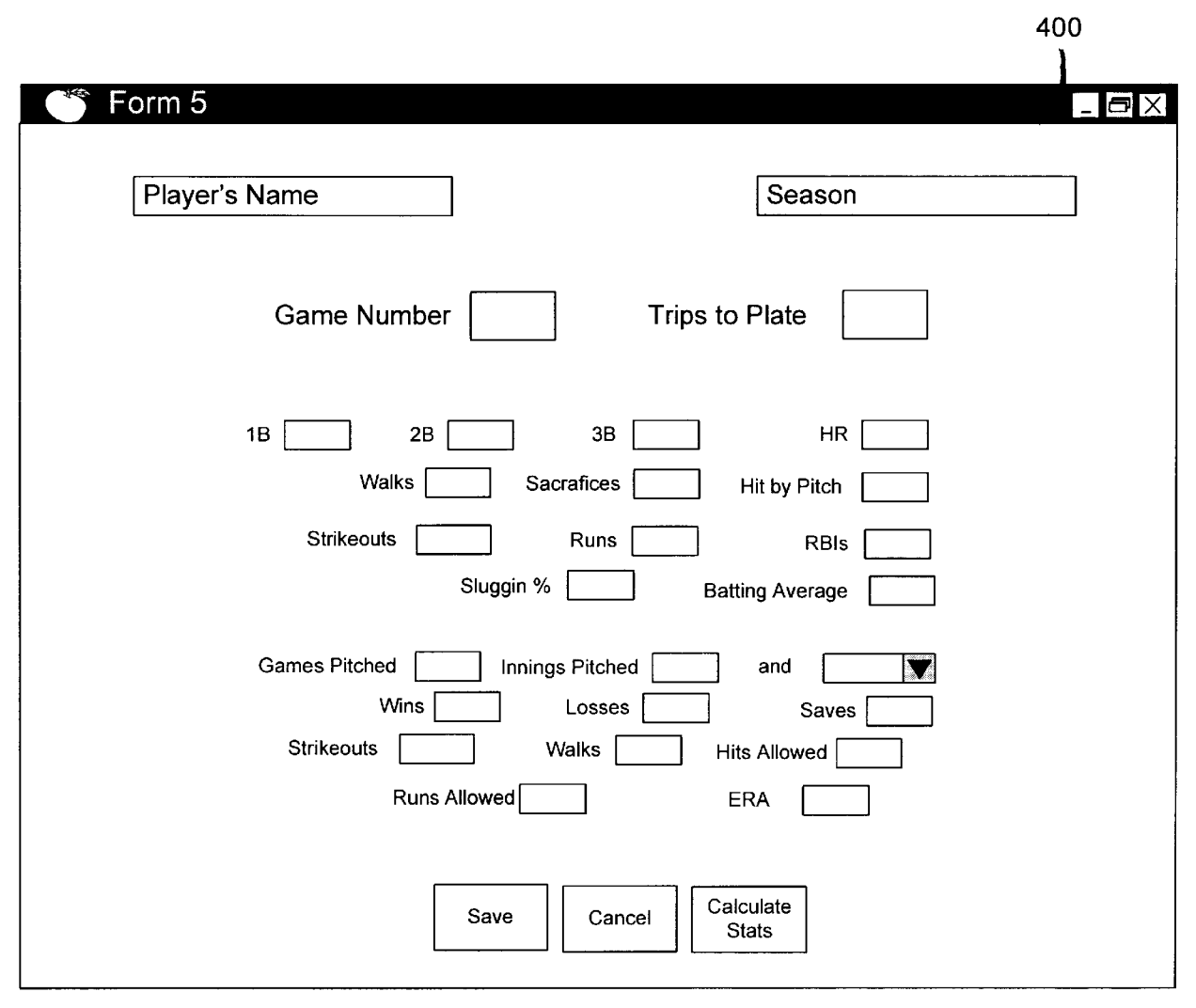

FIG. 3 is a screenshot demonstrating an illustrative form 300 that allows a user to input game/season statistics for a selected player on a game-by-game basis. A grid 302 may be used to display game/season statistics for each game in a season. For brevity, the exemplary grid 302 shows only a "Game" field 302 and a "Trips to Plate" field 306. Those skilled in the art will appreciate that the grid 302 may be expanded to included any number fields for the entry of other game/season statistics. A user may add a new game to the grid 302 by activating the "Add Game" button 308. Likewise the user may delete a game from the grid 302 by activating the "Delete Game" button 310, or edit a game in the grid 302 by highlighting the desired game in the grid 302 and activating the "Edit Game" button 312. Activation of the "Add Game" button 308 or "Edit Game" button 314 may allow the user to enter or modify game/season statistics via the form 300 of FIG. 3. Alternatively, activation of the "Add Game" button 308 or "Edit Game" button 314 may trigger the display of a new form, such as form 400 shown in FIG. 4.

As mentioned, the present invention may be configured to maintain a statistics database for storing the statistical data input via the above-described forms. Users may continually input their statistical data so that trading cards may be created to reflect a player's performance over many different seasons, or over a career. Selected sub-sets of statistical data may also be extracted from the statistics database of inclusion on a "special edition" trading card, such as a trading card relating to a player's performance in an all-star game.

Furthermore, statistical records may be maintained for a plurality of players, so that the demographic statistics and/or game/season statistics of each player may be compared to those of the other players. The user may be provided with the option to compare a selected statistic or selected statistics of a player with those of other player in a particular age group, other players playing the same position, other players in other leagues, etc. In an exemplary embodiment, the user may specify a list of players, such as a "buddy list," and the present invention will retrieve the statistical records for each listed player from memory for comparative purposes. The statistics database or data file for storing statistical information may also include a record of comparative statistics and ordinal rankings of a player.

In an exemplary embodiment, the present invention is designed to allow a user to create a customized sports trading card displaying images of a featured player and statistical data of the featured player, such as demographic statistics, game/season statistics, cumulative statistics, comparative statistics, etc. As will be described below, statistical data for a player may be retrieved from memory and displayed on the trading card. The selection and arrangement of statistical data and images on a trading card may be left up to the user or may be dictated by pre-designed templates that are stored in memory.

Figure 5:
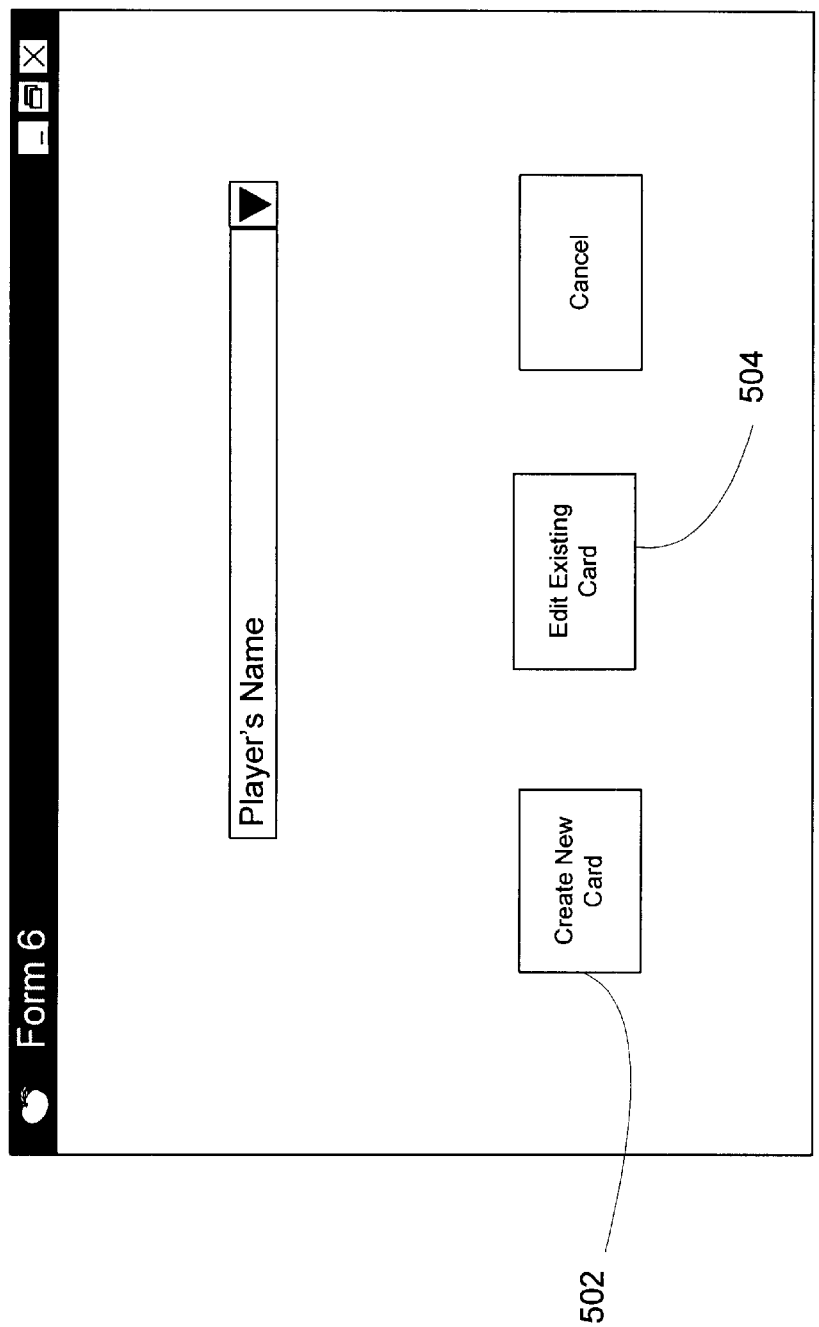
FIG. 5 is a screenshot demonstrating an illustrative form that presents the user with the option to begin creating a new trading card or to begin editing an existing trading card in accordance with an exemplary embodiment of the present invention.

FIG. 5 is a screenshot demonstrating an illustrative form that presents the user with the option to begin creating a new trading card or to begin editing an existing trading card. If the user activates the "Create New Card" button 502, the present invention will launch an appropriate graphical user interface to assist the user in creating a new trading card. The appropriate graphical user interface may comprise a series of forms, which may be referred to as a "Create New Card wizard," or any other well-known interface for accepting user responses and facilitating input of data. Likewise, if the user activates the "Edit Existing Card" button 504, an "Edit Existing Card wizard" or other appropriate graphical user interface may be launched.

In a preferred embodiment of the present invention, customized trading cards may be created from pre-designed templates. Templates may dictate the overall appearance of a trading card, including the arrangement of statistical data, images, graphical objects, etc. Any number of pre-designed templates may be stored in a memory storage device, such as in a "templates database" or a data file. A single template may include a portion corresponding to the front of the trading card and a portion corresponding to the back of a trading card. In order to provide the user greater flexibility in designing a trading card, front templates may be designed specifically for the front of a trading card and back templates may be designed specifically for the back of a trading card. Accordingly, the user may be prompted to select one front template for the front of the card and one back template for the back of a trading card to be created.

Figure 6:
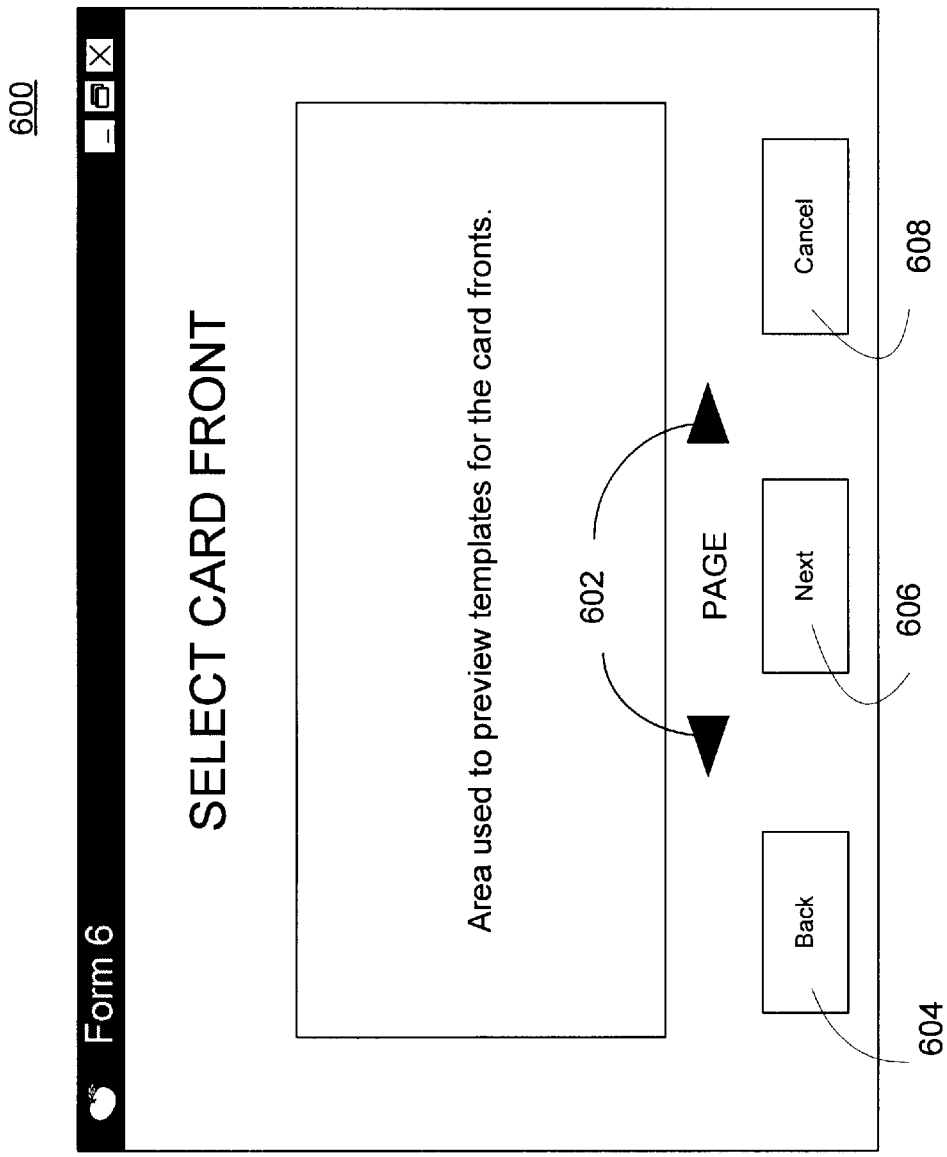
FIG. 6 is a screenshot demonstrating an initial form of an illustrative Create New Card wizard in accordance with an exemplary embodiment of the present invention.

FIG. 6 is a screenshot demonstrating an initial form 600 of an illustrative Create New Card wizard. Such an initial form 600 may be provided in order to allow users to select a front template for the front of the card. A textual list of available front templates may be displayed on the form 600. Preferably, a graphical representation known as a "preview" will also be displayed on the form 600. An interface, such as the exemplary "PAGE" arrows 602, may be provided in order to allow the user to scroll through a plurality of previews of available front templates. A "Back" button 604 may be activated to cause the display to return to the form 500 of FIG. 5. A "Next" button 606 may be activated to cause the display to change to a similar form for selection of a back template. Activation of the "Cancel" button 608 may cause the display to return to a main switchboard screen, as describe above.

Trading cards typically include one or more photographic images of the featured player. Thus, once the template or templates have been selected for a trading card, the user may be prompted for selection of one or more photographs to be included on the trading card. In a preferred embodiment, the present invention is configured with the functionality for importing into the templates digital images stored in files having such popular formats as TIFF, JPEG, GIF, BMP, and the like. The present invention may also comprise functionality for editing such image files, or for interacting with any known photo editor program module.

Figure 7:
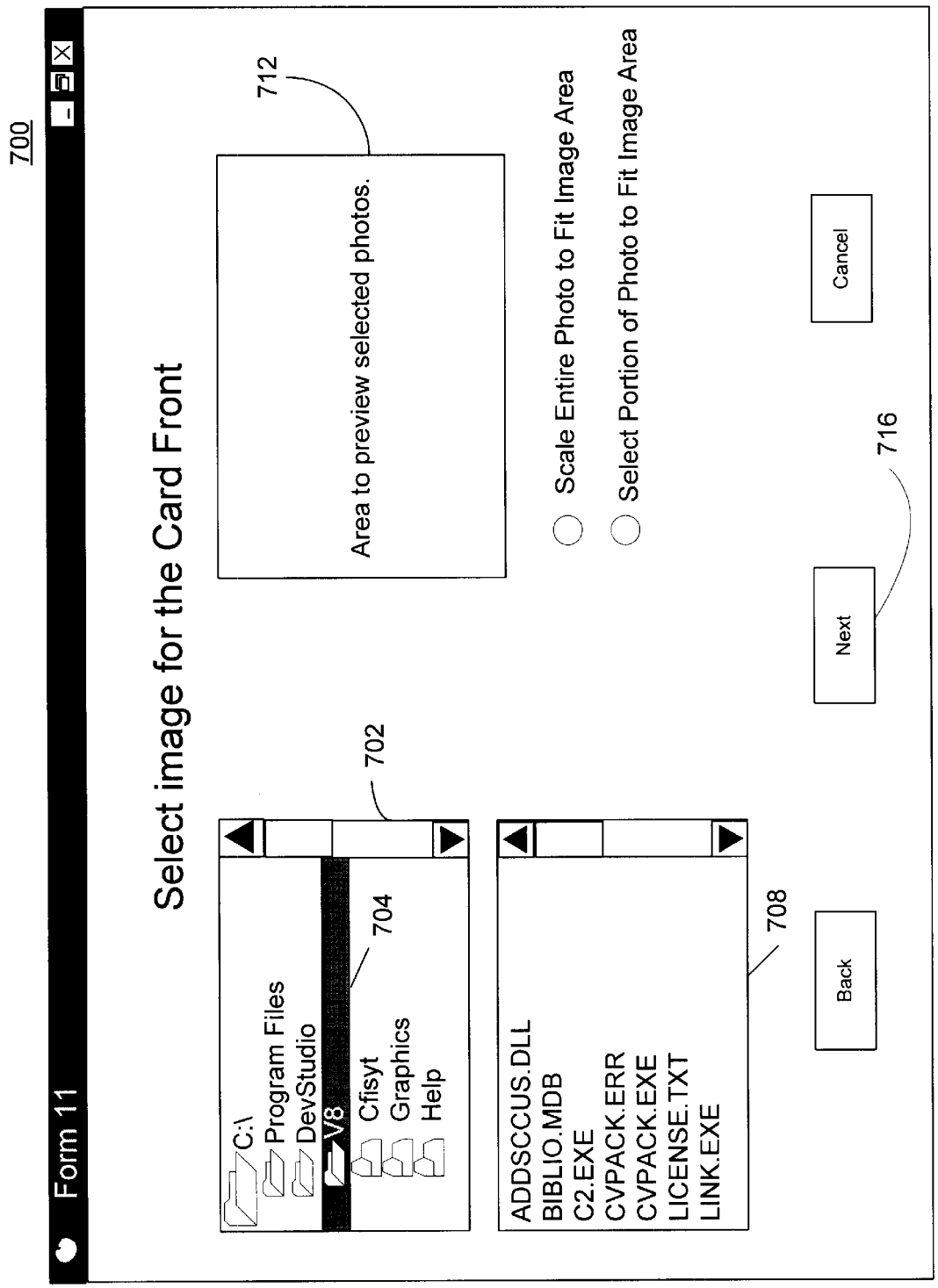
FIG. 7 is a screenshot demonstrating a form in an illustrative Create New Card wizard that allows a user to preview and select an image to be used on the front of the trading card, in accordance with an exemplary embodiment of the present invention.

FIG. 7 is a screenshot demonstrating a form 700 in an illustrative Create New Card wizard that allows a user to preview and select an image to be used on the front of the trading card. As shown, a graphic representation of a file directory 702 may be displayed to the user. The user may select a file folder 704 from the file directory 702, which causes the contents of the file folder 704 to be displayed in a window 708. A preview of a selected file from the window 708 may be displayed in a preview area 712. The user may be presented with this or any other well-know interface for selecting an image to be displayed on the customized trading card.

An images file stored in memory may comprise any type of digital image. For example, a photograph may be digitized using an optical scanner or the like and stored as an image file. Image files may also comprise digital images created by a digital camera or other digital video device. In addition, image files may comprise computer rendered images, drawings, etc.

As mentioned, the present invention may be configured to include or interact with a photo editor program module. In this regard, the image selected for inclusion in the front template may be modified so as to fit within a designated image area of the front template. As shown on form 700 of FIG. 7, the user may be presented with the option to select a "Scale Entire Photo to Fit Image Area" radio button 710 or a "Select Portion of Photo to Fit Image Area" radio button 712. Other options for editing an image may be presented to the user as well. In the exemplary form 700, activation of the "Next" button 716 may trigger the display of another form relating to the radio button (710 or 712) selected by the user.

Figure 8:
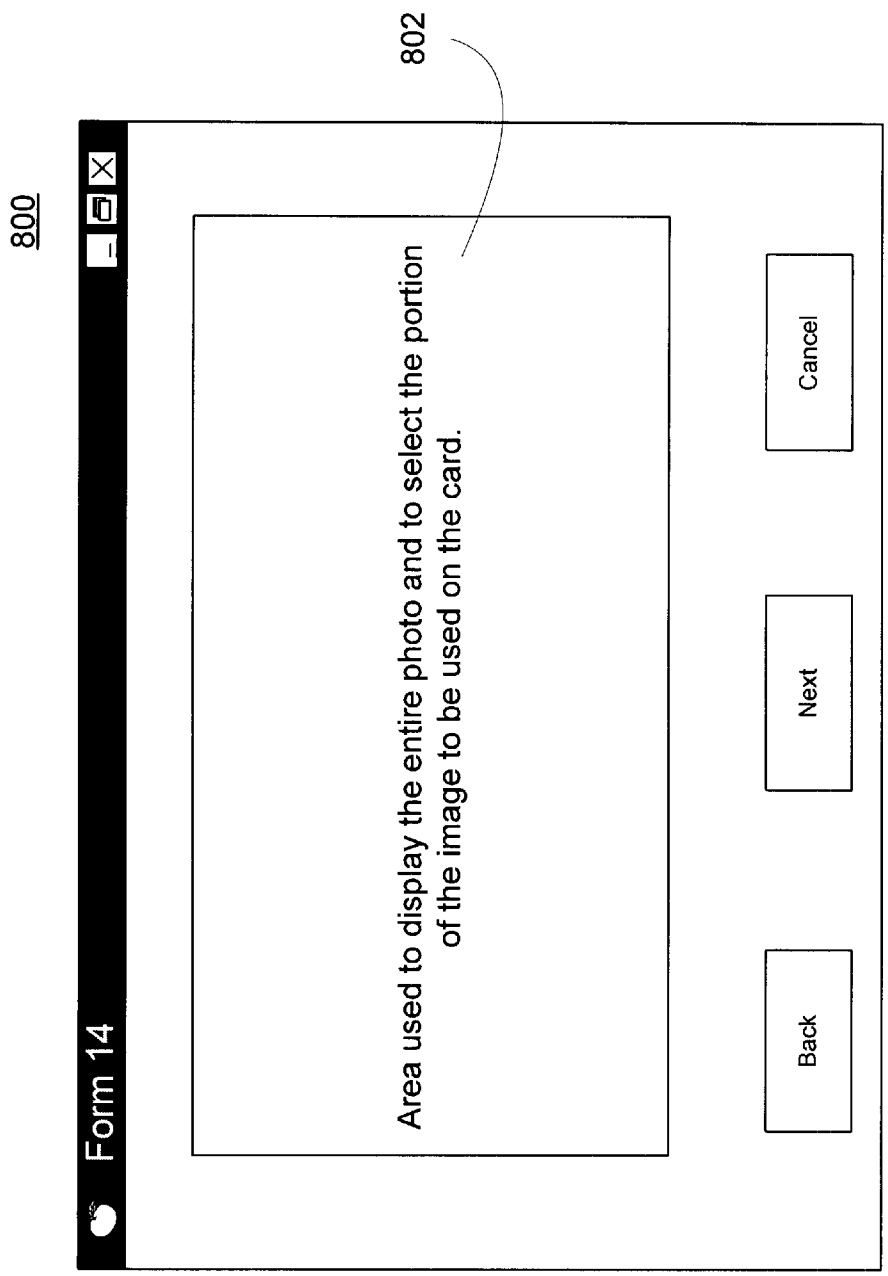
FIG. 8 is a screenshot demonstrating a form in an illustrative Create New Card wizard that allows a user to select a portion of a photo to be included in the image area of the card template, in accordance with an exemplary embodiment of the present invention.

If the user had activated the "Select Portion of Photo to Fit Image Area" radio button 712, activation of the "Next" button 716 would cause the form 800 of FIG. 8 to be displayed. FIG. 8 is a screenshot demonstrating an illustrative form 800 in an illustrative Create New Card wizard that allows a user to select a portion of a photo to be included in the image area of the card template. The selected image may be displayed in the image display area 802. The user may then use a mouse or other input device to highlight a potion of the selected image to be imported into the image area of the front template. As will be apparent to those of skill in the art, selection of a back template and an image to be included therein may be accomplished in the same manner as described with respect to the front template.

Upon selection of a template or templates and an image or images to be included therein, an exemplary embodiment of the present invention may import statistical data for the featured player from memory into pre-defined statistical data fields of the template or templates. The template or templates having images and statistical data may be presented to the user for finalization of the customized trading card. Finalization of the customized trading card may involve changing the colors and/or fonts of the text on the card, changing the overall color scheme of the trading card, changing the color or position of selected graphic objects on the trading card, and adding or deleting graphic objects to or from the trading card. Font files, color files, and graphic object files may all be stored in memory in a traditional manner. These and other finalization options may be presented to the user.

Figure 9:
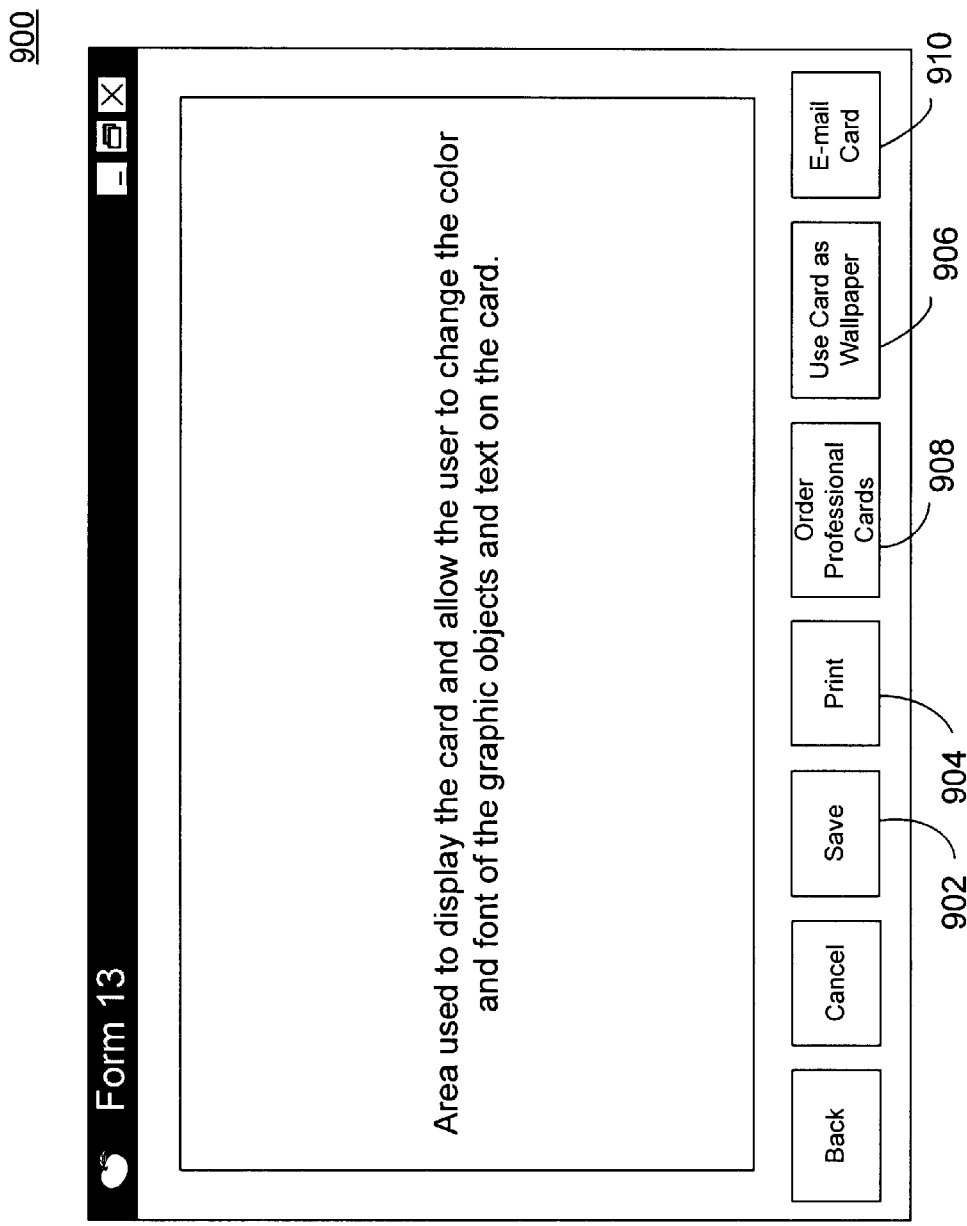
FIG. 9 is a screenshot demonstrating an illustrative form that allows a user to view the customized trading card and to perform finalization options, in accordance with an exemplary embodiment of the present invention.

FIG. 9 is a screenshot demonstrating an illustrative form that allows a user to view the customized trading card and to perform the above-mentioned finalization options. Various menus, tool bars or other user interfaces (not shown) may be provided for changing colors, fonts, graphic objects, etc. on the trading card. The finalized trading card may be stored as a card file in memory by activation of the "Save" button 902. A card file may be sent to a local printer by activation of the "Print" button 904, used as desktop wallpaper by activation of the "Use Card as Wallpaper" button 906, or transmitted to a printing service provider for printing of a professional quality card by activation of the "Order Professional Cards" button 908. A card file may also be e-mailed to a user device by activation of a "E-mail Card" button 910. Transfer of the card file to a printing service provider may be accomplished via e-mail, FTP, or any other well-known communications transfer protocol. Of course, the user may also save the card to a floppy disk or other storage medium and send the storage medium to the printing service provider.

Figure 10:
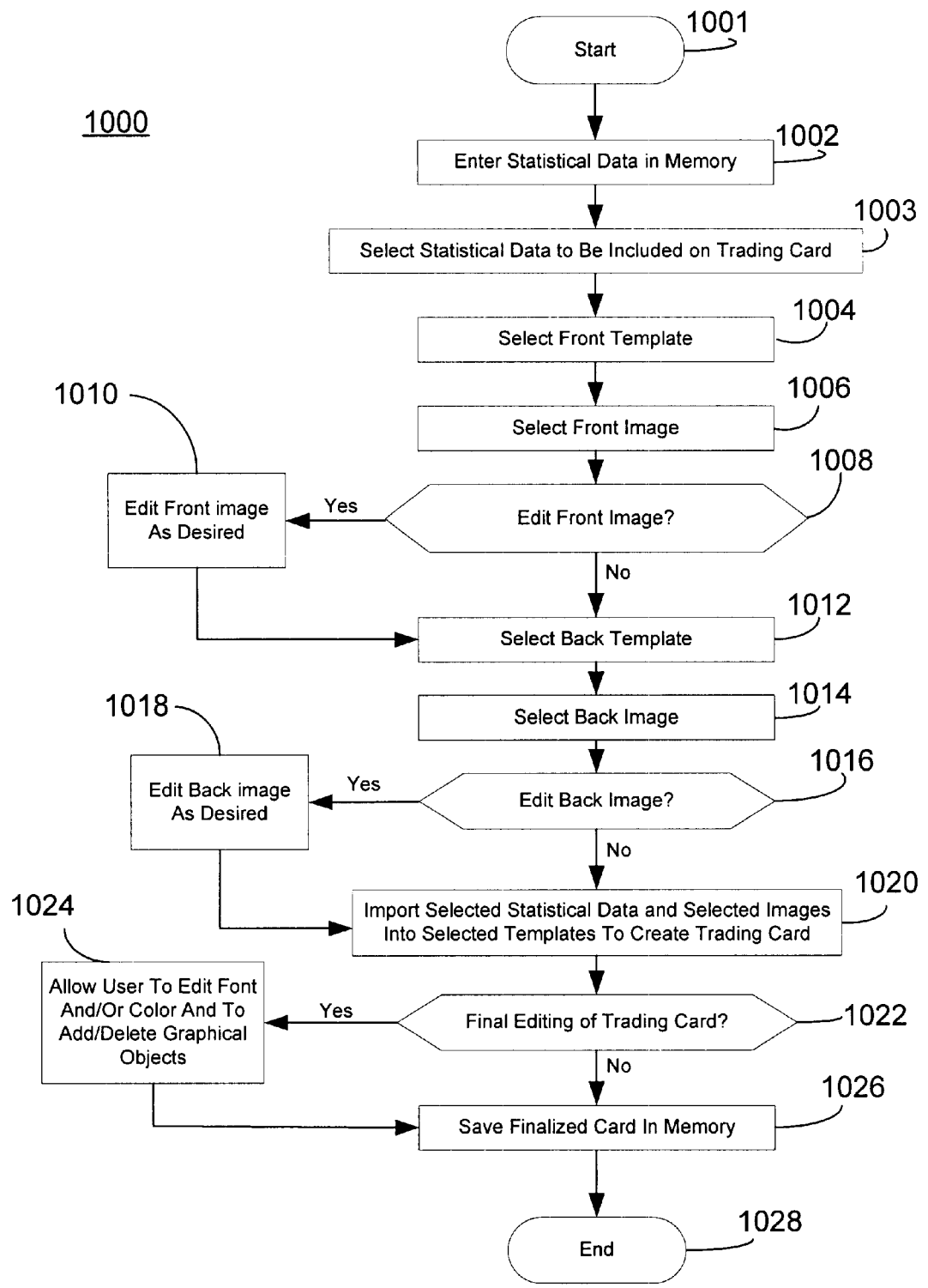
FIG. 10 is a flowchart illustrating the steps involved in an exemplary method for creating a trading card according to the present invention.

FIG. 10 is a flowchart illustrating the steps involved in an exemplary method 1000 for creating a trading card according to the present invention. The method 1000 begins at starting block 1001 and advances to step 1002 where statistical data of the player to be featured on the trading card is entered into memory. Statistical data for the player may already exist in memory, making the performance of step 1002 optional. Next at step 1003, statistical data from memory is selected for inclusion in the trading card. Selection of statistical data may comprise selection of statistical data relating to a particular season or seasons, to a player's career or to another desired period of time. Statistical data may comprise demographic statistics, game/season statistics, cumulative statistics, comparative statistics and the like.

A plurality of pre-designed trading card templates may be stored in memory. A template may be used to dictate the design and arrangement of the elements of a trading card, e.g. statistical data, images, graphic objects, etc. At step 1004, a front template is selected for the customized trading card. A front template may comprise statistical data fields and one or more image fields. At step 1006 an image is selected for inclusion in each of the image fields of the front template. In this example, it will be assumed that the front template comprises a single image field and that a single image is selected for inclusion therein.

Next at step 1008, a determination is made as to whether the image selected for inclusion in the front template is to be edited. Editing the image may comprise enlarging or reducing the entire image to fit in the image field of the front template. Editing the image may also comprise selecting a portion of the image to be displayed in the image field of the front template. Other well-known image editing functions may also be performed. If the image is to be edited, such editing is performed at step 1010, otherwise the method proceeds directly to step 1012, where a back template is selected. It will be assumed in this example that the back template includes various statistical data fields and a single image field. At step 1014, an image is selected for inclusion in the image field of the back template. At step 1016, a determination is made as to whether the image selected for inclusion in the back template is to be edited. If the image is to be edited, such editing is performed at step 1018, otherwise the method proceeds directly to step 1020, where the selected statistical data and images are imported into the appropriate statistical data fields and images of the front and back templates.

At step 1022, a determination is made as to whether any further editing is to be performed to the templates in order to finalize the trading card. Final editing may comprise changing the color scheme of the trading card, changing the font or color of the text of the trading card, adding or deleting graphic object to the trading cards, etc. If the templates are to be edited, such final editing is performed at step 1024. Otherwise, the method proceeds directly to step 1026, where the finalized trading card is saved in memory as a card file. The exemplary method 1000 ends at step 1028.

Those skilled in the art will recognize that the order of the steps described with reference to exemplary method 1000 for creating a custom trading card may be altered without departing from the spirit and scope of the present invention. For example, a front template and a back template may be selected prior to selection of any images to be included in either the front template or the back template. Furthermore, a back template may be selected prior to a front template. Accordingly, the description of exemplary method 1000 is not intended to scope of the present invention.

Figure 11:
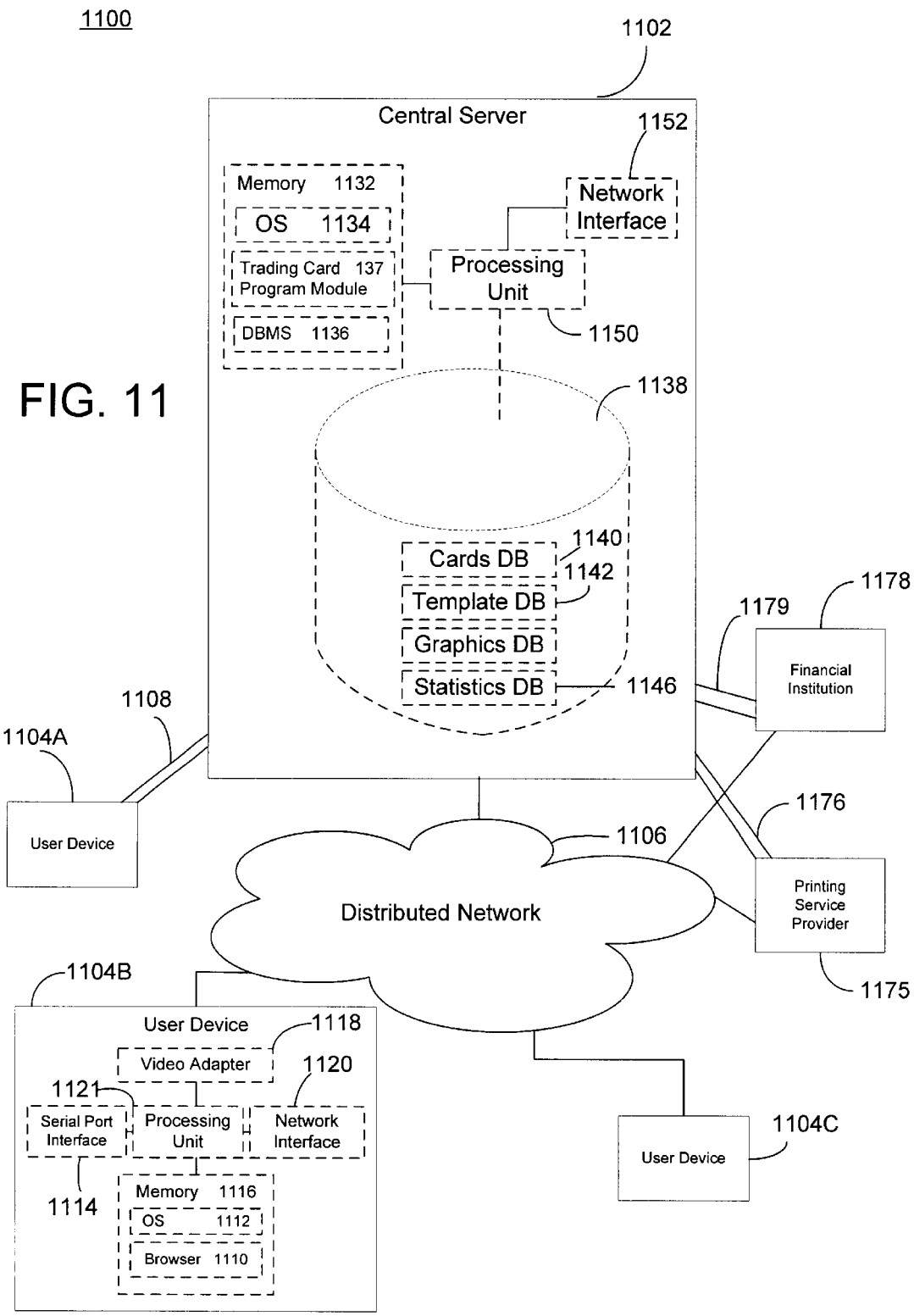
FIG. 11 is a functional block diagram illustrating an exemplary embodiment of the present invention that is configured for facilitating the creation of a customized trading card in a client/server network environment.

In another embodiment, the present invention may be configured for facilitating the creation of a customized trading card in a client/server network environment. As shown in FIG. 11, the exemplary trading card program module 137 may be configured for execution by a central server 1102 that is accessible by a user device 1104B&C via a distributed network 1114, such as the Internet. Thus, a user device 1104B&C may be configured for execution of a browser 1110 in order to interact with the exemplary trading card program module 137 at the central server 1102. As shown, a user device 1104A may also communicate with the central server 1102 via a dedicated communications link 1108.

A user device 1104B may comprise a conventional computer system, as described with respect to FIG. 1. Thus, a user device may comprise a desktop computer, a laptop computer, a hand-held device (such as a personal digital assistant), or the like. In general, a user device may comprise a memory for storing such things as an operating system 1112 and a browser 1110 and other program modules or data files, a processing unit 1121 for executing application programs, such as the browser 1110, a serial port 1114 for communication with input devices such as a keyboard and a mouse, a video adapter for communication with a display device, and a network interface 1120 for communication with the distributed network 1106 or a dedicated communications link 1108. As will be apparent to those of skill in the art, a user device 1104 may comprise additional features and components that are not shown in the figure.

The central server 1102 may also comprise a conventional computer system configured to function as a network server. For example, the central server 1102 may comprise a memory 1132 for storing an operating system 1134, a trading card program module 137, a database management system (DBMS) 1136, as well as other program modules and data files. In a preferred embodiment, the central server executes the Microsoft NT server operating system and a SQL Server or Microsoft Access DBMS. Other program modules executed by a central server 1102 in a preferred embodiment are the well-known Visual Basic Developer, Microsoft Transaction Server, Microsoft Internet Information Server, Lead Tool Graphic Imaging with ActiveX controls, Active Server Pages, and HTML Java Script.

The central server 1102 may further comprise a processing unit 1150 and a network interface 1152. The central server may also comprise or be in communication with a database 1138 for storing data relating to the creation of trading cards. The database 1138 may comprise a statistics database 1146 for storing statistical data for a plurality of players, a template database 1142 for storing a plurality of trading card templates, a graphics database for storing data files relating to graphic objects, fonts, colors, etc., and a cards database 1140 for storing finalized trading cards.

With statistical data corresponding to many players stored in the statistics database or other data file at the central server 1102, a user from any remote location may determine how the statistics of a particular player compare to those of other players. It is therefor possible to for a player to determine an ordinal rank and perform comparisons for any desired statistic in any demographic group. For example, just as all major league sports leagues keep track of league leaders, it is now be possible to keep track of little league leaders on a national/international level. A user may choose to track, analyze and compare the statistics of a desired list of players. The desired list of players may relate, for example, to a top number of players in a particular category, or a list of the user's friends.

In operation of an exemplary embodiment, the trading card program module 137 at the central server 1102 may be accessed from a user device 1104 via the distributed network 1106 by way of a web site. The web site will display to the user device a series of forms designed to facilitate the entry of statistical data and the creation of a trading card. The user will input statistical data into the forms and the statistical data will be stored in a database accessible by the central server 1102. The user may also download digital images to the central server 1102. Those skilled in the art should appreciate that statistical data and images may be downloaded to the central server 1102 from the user device 1104 in a batch mode, or in an interactive mode. For example, in a batch mode, the user may download an entire statistics database record from the user device 1104 to the central server 1102. In an interactive mode, the user may transmit one statistical data value at a time to the central server 1102.

A list of available templates may be presented to the user through a web site. The user may then select desired templates for the trading card. Statistical data and images transferred by the user to the central server 1102 may be imported in the template for creation of the trading card. The user may then perform any desired final editing to the trading card via the web site The finalized card may be stored in a card file in a card database or data file accessible by the central server 1102. The user may e-mail a copy of the card file to a user device 1104. Of course, the user may also download and save a copy of the card file in the local memory 1116 of the user device 1104. On the local user device, the user may designate the card file as "wallpaper."

The user may also print the card file to a local printer or may request that professionally printed cards be ordered from a printing service provider 1175. The central server 1102 may comprise hardware and software components for printing professional versions of the custom trading cards. The central server 1102 may also communicate with a printing service provider 1175 via the distributed network 1106 or a private communications link 1176. The printing service provider may thus be maintained or controlled by the same entity that maintains or controls the central server 1102, or the printing service provider may be an independent entity.

In an exemplary embodiment, the user may also be presented with the option to order other items, such as sports memorabilia relating to the custom trading card, in addition to professionally printed versions of the custom trading card. For example, if the custom trading card relates to a player for a team named the "Red Sox," the user may be given the option to purchase a replica jersey from the Major League Baseball team of the same name. Of course, the items selected for presentation to the user do not have to relate directly to the content of the custom trading card.

In response to a user request for professionally printed cards (and/or other items), the central server 1102 may place an order with the printing service provider 1175 by way of e-mail, FTP, a web-site, or other electronic communications tool. The order placed by the central server 1102 may also indicate printing specifications as desired by the user, including but not limited to printing stock, coating or embossing, seals or decals, etc. Furthermore, the central server may accept payment for the professionally printed cards from the user by way of any well known electronic funds transfer mechanism. A typical electronic funds transfer involves transmittal of a financial account number (e.g., a credit card or debit card account number) via a secured web-site. The central server may thus interact with a financial institution 1178 or a point-of-sale device via the distributed network 1106 or a dedicated communications link 1179 for completing the transaction with the user. The central server and the printing service provide may also perform settlement via electronic funds transfer, if appropriate.

Figure 12:
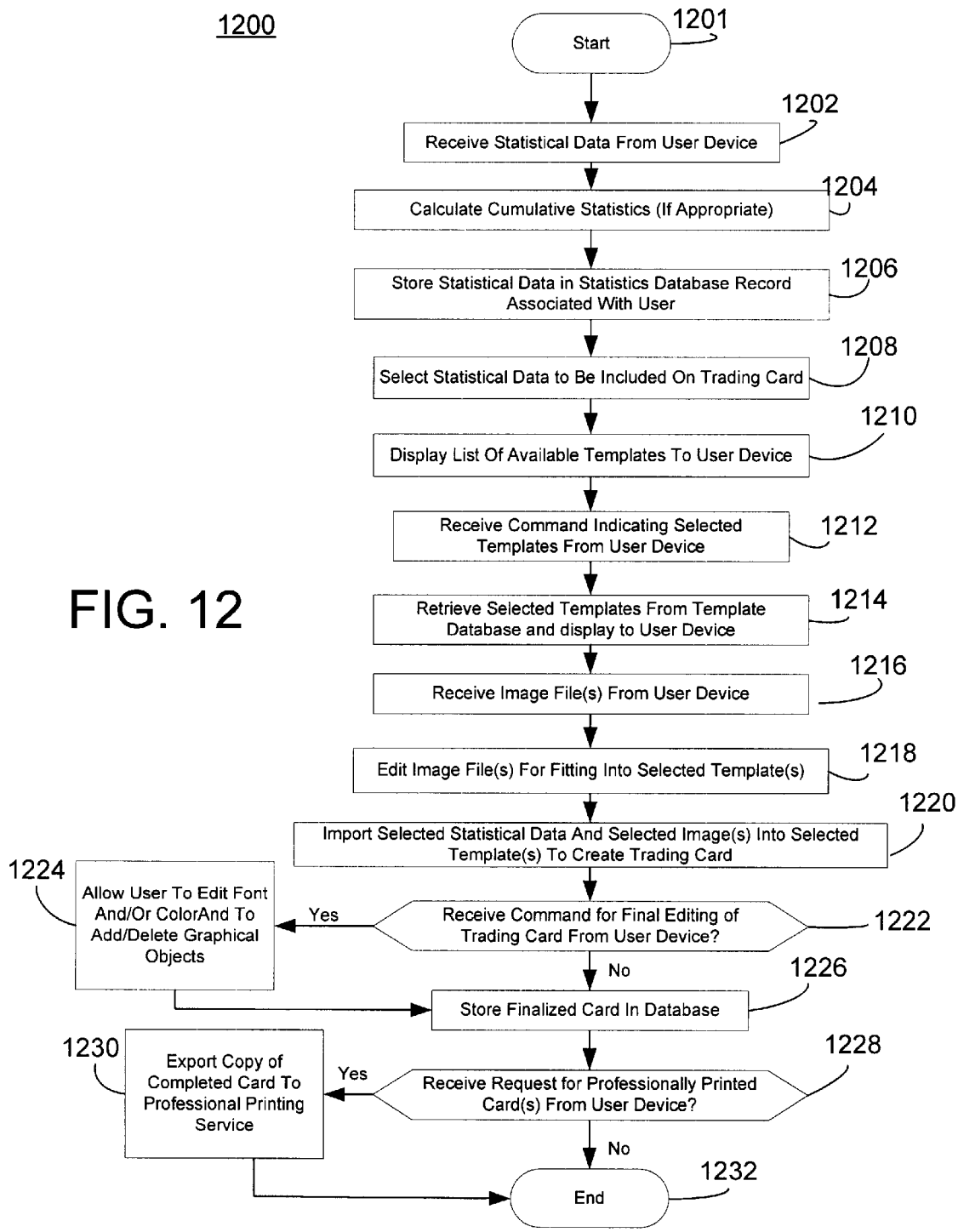
FIG. 12 is a flowchart illustrating the steps involved in an exemplary method for creating a trading card in a network environment according to the present invention.

FIG. 12 is a flowchart illustrating the steps involved in an exemplary method 1200 for creating a trading card in a network environment according to the present invention. The method 1200 begins at starting block 1201 and advances to step 1202 where statistical data of the player to be featured on the trading card is received at central server from a remote user device. The statistical data may be transferred to the central server via a network connection, such as via the Internet. Next at step 1204, cumulative statistics are calculated based on the statistical data received from the user device, if appropriate. For example, a player's batting average, slugging percentage, ERA, etc. may be automatically calculated based on the statistical data received from the user device. In certain situations, the user may desire to manually enter values for cumulative statistics. At step 1206 the statistical data received from the user device, including any calculated cumulative statistics, are stored in a statistics database accessible by the central server. Statistical data, including cumulative statistics, for the player may already exist in a database accessible by the central server, making the performance of steps 1202–1206 optional.

At step 1208, statistical data for the featured player is selected from the statistics database for inclusion in the trading card. Again, selection of statistical data may comprise selection of statistical data relating to a particular season or seasons, to a player's career or to another desired period of time. Statistical data may comprise demographic statistics, game/season statistics, cumulative statistics, comparative statistics and the like.

At step 1210, a plurality of pre-designed trading card templates are displayed to the user device for selection of a front template and a back template for the trading card. At step 1212, a command is received from the user device indicating the templates selected for creation of the trading card. In response to the command, the selected templates are retrieved from a template database and are displayed to the user device at step 1214. At step 1216, one or more image files are received at the central server from the user device for inclusion in the trading card templates. Of course, image files may already be stored in an image database accessible by the central server. At step 1218 the images selected for inclusion in the templates are edited as desired. Editing the images may comprise enlarging or reducing the images to fit in the image fields of templates. Editing the images may also comprise selecting a portion of each image to be displayed in the image fields of the templates. Other well-known image editing functions may also be performed.

Next, the method proceeds to step 1220 where the selected statistical data and images are imported into the appropriate statistical data fields and images of the trading card templates. At step 1222, a determination is made as to whether any final editing is to be performed to the template in order to finalize the trading card. Final editing may comprise changing the color scheme of the trading card, changing the font or color of the text of the trading card, creating, adding, deleting, or moving graphic object, etc. If the templates are to be edited, such final editing is performed at step 1224. Otherwise, the method proceeds directly to step 1226, where the finalized trading card is saved as a card file in a card database or data file accessible by the central server.

At step 1228 a determination is made as to whether a request is received from the user device for a professionally printed version of the finalized trading card. If a request for a professionally printed trading card is received, the card file is electronically transferred from the central server to a remote device accessible by a printing service provider at step 1230. After the card file has been transferred to the printing service provider, or if no request for professionally printed cards was received, the exemplary method 1200 ends at step 1232.

While this invention has been described in detail with particular reference to preferred and exemplary embodiments thereof, it will be understood that variations and modifications can be effected within the spirit and scope of the invention as described hereinabove and as described in the appended claims. In particular, various user interface configurations have been described with reference to exemplary embodiments of the present invention. Such user interface configurations have been selected based on ease of use and logical organization and presentation considerations. Those skilled in the art, however, will recognize that other type of user interface configurations may be implemented without departing from the spirit and scope of the present invention. For example, the user interface configurations of the present invention are not intended to be limited to the specific drop down menus, buttons, radio buttons, input fields, etc. that have been described herein. Other graphical devices for presenting information and choices to a user are well known in the art and incorporation or substitution of such graphical devices in the present invention are considered to be within the skill of the art.

I claim:

1. A computerized method for creating a customized trading card comprising:
   maintaining a statistics database of statistical data relating to the performance of a person in an activity;
   calculating cumulative statistical data relating to the performance of a person in an activity, wherein calculating said cumulative statistical data comprises performing one or more calculations using computer implemented algorithms based on said statistical data retrieved from said statistics database;
   entering a digital image into memory;
   selecting from a template database a template for the customized trading card, the template comprising a pre-designed arrangement of statistical data fields and an image field;
   importing the cumulative statistical data into the statistical data fields of the template; and
   importing the digital image into the image field of the template.

2. The method of claim 1, wherein the statistical data comprises a first statistic for the person;
   wherein the database further stores statistical data relating to the performance of at least a second person in the activity, the statistical data relating to the performance of at least the second person comprising the first statistic for at least the second person; and
   wherein the first statistic of the person may be compared to the first statistic of at least the second person in order to determine an ordinal rank for the first person relating to the first statistic.

3. The method of claim 2, wherein the ordinal rank for the first person relating to the first statistic is imported into a selected one of the statistical data fields of the template.

4. The method of claim 1, wherein said cumulative statistical data comprises one or more game/season statistics related to the performance of the person in a sporting activity.

5. The method of claim 4, wherein the sporting activity comprises baseball; and
   wherein the cumulative statistic is selected from the group consisting of batting average, slugging percentage and ERA.

6. The method of claim 1, wherein entering the digital image into memory accepting as input a digital image file containing a photograph of the person; and
   storing the digital image file in memory.

7. The method of claim 1, wherein a plurality of digital images are entered into memory;
   wherein selecting a template for the customized trading card comprises selecting a front template for the front of the customized trading card and selecting a back template for the back of the customized trading card; and
   wherein importing the digital image into the image field of the template comprises selecting a front image from the memory to be imported into a front image field of the front template and selecting a back image from the memory to be imported into a back image field of the back template.

8. The method of claim 7, wherein importing the cumulative statistical data into the statistical data fields of the template comprises importing a selected set of the cumulative statistical data into a plurality of front statistical data fields of the front template and importing a second selected set of the cumulative statistical data into a plurality of back statistical data fields of the back template.

9. The method of claim 1, wherein a plurality of graphical objects are stored in memory; and
   wherein the method further comprises importing at least one of the graphical objects into the template.

10. A system for creating a trading card comprising:
    a memory storage device for storing user-entered statistical data, templates and images, the statistical data relating to the performance of a person in an activity;
    a display device for displaying the user-entered statistical data, a list of the templates and a list of the images;
    an input device for:
      selecting a front template from the list of templates, the front template comprising a pre-designed arrangement of front statistical data fields and a front image field,
      selecting a back template from the list of templates, the back template comprising a pre-designed arrangement of back statistical data fields and a back image field,
      selecting front statistical data from the user-entered statistical data to be included on the front template,
      selecting back statistical data from the user-entered statistical data to be included on the back template,
      selecting a front image from the list of images to be added to the front template, and
      selecting a back image from the list of images to be added to the front template; and
    a processing unit in communication with the input device and the memory storage device operable to:
      import the front statistical data into the front statistical data fields of the front template,
      import the back statistical data into the back statistical data fields of the back template,
      import the front image into the front image field of the front template, and
      import the back image into the back image field of the back template.

11. The system of claim 10, wherein the statistical data comprises a first statistic for the person;
    wherein the memory storage device further stores statistical data relating to the performance of at least a second person in the activity, the statistical data relating to the performance of at least the second person comprising the first statistic for at least the second person; and
    wherein the processing unit is further operable to compare the first statistic of the person to the first statistic of at least the second person in order to determine an ordinal rank for the first person relating to the first statistic.

12. The system of claim 11, wherein the processing unit is further operable to import the ordinal rank for the first person into a selected one of the front statistical data fields or of the back statistical data fields.

13. The system of claim 10, wherein the statistical data relates to the performance of the person in a sporting activity and comprises game/season statistics; and
wherein the processor is further operable to calculate a cumulative statistic based on the game/season statistics.

14. The method of claim 13, wherein the sporting activity comprises baseball; and
wherein the cumulative statistic is selected from the group consisting of batting average, slugging percentage and ERA.

15. The method of claim 13, wherein the cumulative statistic is imported into a selected one of the statistical data fields of the template.

16. A method for creating a trading card comprising:
storing in a statistics database statistical data received from a user device, the statistical data relating to the performance of a person in an activity;
calculating cumulative statistical data relating to the performance of a person in an activity, wherein calculating said cumulative statistical data comprises performing one or more calculations using computer implemented algorithms based on said statistical data retrieved from said statistics database;
receiving an image file from the user device;
presenting a list of pre-defined templates to the user device;
receiving a template selection command from the user device indicating a selected template from the list of pre-defined templates, the template comprising a pre-designed arrangement of statistical data fields and an image field
importing the image file received from the user device into the image field of the selected template; and
importing the cumulative statistical data into the statistical data fields of the selected template.

17. The method of claim 16, further comprising the step of presenting the selected template including the image file and the statistical data to the user device as the trading card;
receiving an edit command from the user device indicating that the trading card is to be edited; and
editing the trading card according to the edit command.

18. The method of claim 16, wherein the template selection command received from the user device indicates a selected front template and a selected back template, the selected front template comprising a pre-designed arrangement of front statistical data fields and a front image field, the selected back template comprising a pre-designed arrangement of back statistical data fields and a back image field;
wherein the statistical data comprises front statistical data for inclusion on the front template and back statistical data for inclusion on the back template;
wherein the digital image file comprises a front image for inclusion on the front template and a back image for inclusion on the back template;
wherein importing the image file received from the user device into the image field of the selected template comprises importing the front image into the front image field of the front template and importing the back image into the back image field of the back template;
wherein calculating the cumulative statistical data comprises the calculation of front cumulative statistical data from the front statistical data for inclusion on the front template and the calculation of back cumulative statistical data from the back statistical data for inclusion on the back template; and
wherein importing the cumulative statistical data into the statistical data fields of the selected template comprises importing the front cumulative statistical data into the front statistical data fields of the front template and importing the back cumulative statistical data into the back statistical data fields of the back template.

19. The method of claim 16, comprising storing the template including the cumulative statistical data and the image file as a card file in a card database;
receiving a request for a professionally printed version of the trading card from the user device; and
professionally printing the card file and sending the printed version of the trading card to the user.

20. The method of claim 19, further comprising receiving an electronic payment authorization from the user device for the professionally printed version of the trading cards.

21. The method of claim 20, wherein the electronic payment authorization comprises a financial account number.

22. The method of claim 16, wherein the statistical data received from the user device relates to the performance of the person in a sporting activity and comprises demographic statistics and game/season statistics; and
wherein the statistical data comprises one or more game/season statistics.

23. The method of claim 22, wherein the sporting activity comprises baseball; and
wherein the cumulative statistic is selected from the group consisting of batting average, slugging percentage and ERA.

24. A computerized method for creating a customized trading card comprising:
maintaining a statistics database of statistical data relating to the performance of a first person in an activity, the statistical data comprising at least a first statistic for the person;
wherein the database further stores statistical data relating to the performance of at least a second person in the activity, the statistical data further comprising the first statistic for at least the second person;
comparing the first statistic of the person to the first statistic of at least the second person in order to determine an ordinal rank for the first person relating to the first statistic;
entering a digital image into memory;
selecting from a template database a template for the customized trading card, the template comprising a pre-designed arrangement of statistical data fields and an image field;
importing the statistical data into the statistical data fields of the template; and
importing the digital image into the image field of the template.

25. The method of claim 24, wherein the ordinal rank for the first person relating to the first statistic is imported into a selected one of the statistical data fields of the template.

26. The method of claim 24, wherein the statistical data relates to the performance of the person in a sporting activity and comprises game/season statistics; and
wherein the method further comprises calculating a cumulative statistic based on the game/season statistics.

27. The method of claim 26, wherein the sporting activity comprises baseball; and wherein the cumulative statistic is selected from the group consisting of batting average, slugging percentage and ERA.

28. The method of claim 26, wherein the cumulative statistic is imported into a selected one of the statistical data fields of the template.

29. The method of claim 24, wherein entering the digital image into memory comprises accepting as input a digital image file containing a photograph of the person; and storing the digital image file in memory.

30. The method of claim 24, wherein a plurality of digital images are entered into memory;

wherein selecting a template for the customized trading card comprises selecting a front template for the front of the customized trading card and selecting a back template for the back of the customized trading card; and wherein importing the digital image into the image field of the template comprises selecting a front image from the memory to be imported into a front image field of the front template and selecting a back image from the memory to be imported into a back image field of the back template.

31. The method of claim 30, wherein importing the statistical data into the statistical data fields of the template comprises importing a selected set of the statistical data into a plurality of front statistical data fields of the front template and importing a second predetermined set of the statistical data into a plurality of back statistical data fields of the back template.

32. The method of claim 24, wherein a plurality of graphical objects are stored in memory; and wherein the method further comprises importing at least one of the graphical objects into the template.

33. A method for creating a trading card comprising:

storing in a statistics database statistical data received from a user device, the statistical data relating to the performance of a person in an activity;

receiving at least one image file from the user device;

presenting a list of pre-defined templates to the user device;

receiving a template selection command from the user device indicating a front template and a back template, the front template comprising a pre-designed arrangement of front statistical data fields and a front image field, the back template comprising a pre-designed arrangement of back statistical data fields and a back image field;

importing a front image file into the front image field of the front template and importing a back image into the back image field of the back template; and importing a front statistical data into the front statistical data fields of the front template and importing a back statistical data into the back statistical data fields of the back template.

34. The method of claim 33, further comprising the step of presenting the trading card to the user device;

receiving an edit command from the user device indicating that the trading card is to be edited; and editing the trading card according to the edit command.

35. The method of claim 33, comprising storing the front template including the front statistical data and the front image file and storing the back template including the back statistical data and the back image file as a card file in a card database;

receiving a request for a professionally printed version of the trading card from the user device; and professionally printing the card file and sending the printed version of the trading card to the user.

36. The method of claim 33, wherein the statistical data received from a user device relates to the performance of the person in a sporting activity and comprises demographic statistics and game/season statistics; and wherein the method further comprises calculating a cumulative statistic based on the game/season statistic.

37. The method of claim 36, wherein the sporting activity comprises baseball; and wherein the cumulative statistic is selected from the group consisting of batting average, slugging percentage and ERA.

38. A system for creating a trading card via a network comprising:

a communication device configured for:
receiving a digital image file from a user device,
receiving statistical data from the user device, and
receiving a template selection command from the user device indicating a selected template from the list of pre-defined templates;

a memory storage device configured for:
storing statistical data received from the user device,
storing at least one digital image file received from the user device, and
storing pre-defined templates;

a processor configured for executing a trading card programmable module comprising computer-executable instructions for:
presenting a list of pre-defined templates to the user device for selection,
importing the image file received from the user device into the image field of the selected template, and
importing the statistical data into the statistical data fields of the selected template.

39. The system of claim 38, wherein the statistical data comprises a first statistic for the person;

wherein the memory storage device further stores statistical data relating to the performance of at least a second person in the activity, the statistical data relating to the performance of at least the second person comprising the first statistic for at least the second person; and wherein the processing unit is further operable to compare the first statistic of the person to the first statistic of at least the second person in order to determine an ordinal rank for the first person relating to the first statistic.

40. The system of claim 39, wherein the processing unit is further operable to import the ordinal rank for the first person into a selected one of the front statistical data fields or of the back statistical data fields.

41. The system of claim 38, wherein the statistical data relates to the performance of the person in a sporting activity and comprises game/season statistics; and wherein the processor is further operable to calculate a cumulative statistic based on the game/season statistics.

42. The system of claim 41, wherein the sporting activity comprises baseball; and wherein the cumulative statistic is selected from the group consisting of batting average, slugging percentage and ERA.

43. The system of claim 41, wherein the cumulative statistic is imported into a selected one of the statistical data fields of the template.

* * * * *